United States Patent
Alderman

(10) Patent No.: US 6,811,852 B2
(45) Date of Patent: Nov. 2, 2004

(54) REFLECTIVE HEAT INSULATION

(76) Inventor: Robert J. Alderman, 686 Highland Ter., Canyon Lake, TX (US) 78133

(*) Notice: Subject to any disclaimer, the term of this patent is extended or adjusted under 35 U.S.C. 154(b) by 0 days.

(21) Appl. No.: 10/056,730

(22) Filed: Jan. 25, 2002

(65) Prior Publication Data

US 2003/0061777 A1 Apr. 3, 2003

Related U.S. Application Data

(63) Continuation-in-part of application No. 10/039,101, filed on Jan. 4, 2002, now Pat. No. 6,557,313, which is a continuation-in-part of application No. 09/969,379, filed on Oct. 2, 2001, now abandoned.

(51) Int. Cl.$^7$ ................................................. B32B 3/12
(52) U.S. Cl. ............................ 428/69; 428/71; 428/72; 428/178
(58) Field of Search ................ 428/72, 71, 69, 428/178; 52/407.3, 406.1, 408

(56) References Cited

U.S. PATENT DOCUMENTS

| | | | | |
|---|---|---|---|---|
| 4,136,222 A | * | 1/1979 | Jonnes | 428/72 |
| 4,825,089 A | * | 4/1989 | Lindsay | 250/515.1 |
| 5,270,092 A | | 12/1993 | Griffith et al. | 428/69 |
| 5,853,856 A | * | 12/1998 | Kristal | 428/178 |
| 5,918,436 A | | 7/1999 | Alderman | 52/407.3 |

* cited by examiner

Primary Examiner—Alexander S. Thomas
(74) Attorney, Agent, or Firm—Thomas, Kayden, Horstemeyer & Risley

(57) ABSTRACT

Radiant heat reflective cell blanket (10) is formed with superposed support sheets (12 and 13) that form an array of cells thereover. A dead air space is maintained in each cell, and heat reflective sheets (20 and 21) are located within each cell. The reflective sheets (20 and 21) are adhesively connected to the upper and lower support sheets (12 and 13) to maintain a dead air space therebetween. The cells avoid the accumulation of dust, dirt, and fibrous material on the reflective surfaces of the blanket, thereby maintaining the reflectivity of the blanket, and the cells avoid outside contact by other objects that might reduce the reflectivity of the blanket.

16 Claims, 4 Drawing Sheets

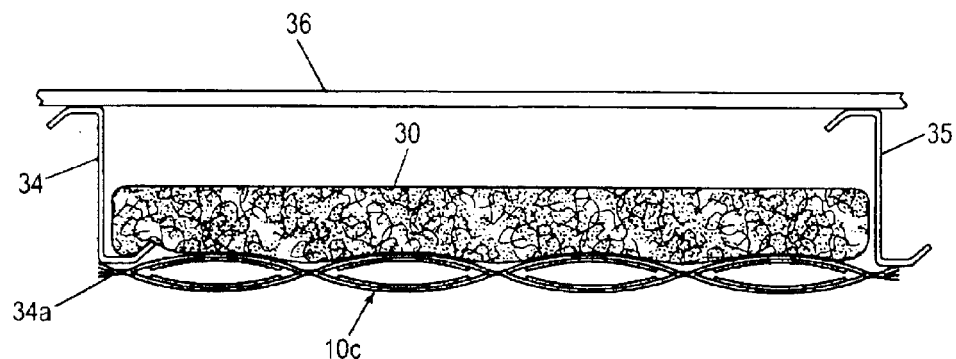
Fig. 6
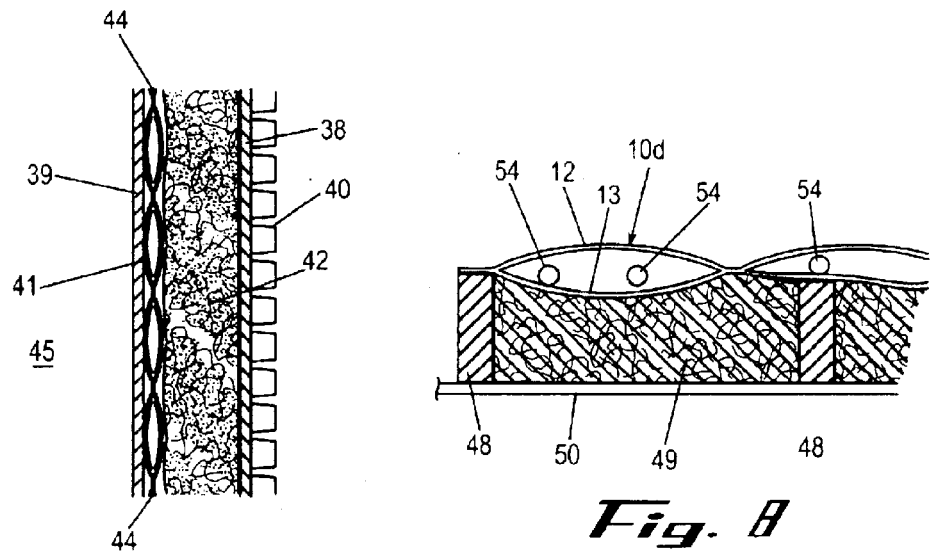
Fig. 7
Fig. 8

REFLECTIVE HEAT INSULATION

CROSS REFERENCE TO RELATED APPLICATIONS

This is a continuation-in-part of U.S. patent application Ser. No. 10,039,101, entitled Blanket Insulation with Reflective Sheet and Air Space, filed in the U.S. Patent and Trademark Office on Jan. 4, 2002 now U.S. Pat. No. 6,557,313. Also, this is a continuation-in-part of U.S. patent application Ser. No. 09/969,379, abandoned entitled Insulation System Having Variable R-value, filed Oct. 2, 2001 which is incorporated herein by reference.

FIELD OF THE INVENTION

This invention involves heat insulation for building structures whereby the walls, roof, ceiling, floors and other wall structures of the building are insulated with sheets of radiant heat insulation, with or without additional layers of convection and/or conduction heat insulation. More particularly, this invention utilizes reflective sheet material such as metal foil in combination with a blanket having an array of air filled cells, for use alone or in combination with other heat insulation materials in wall structures for insulating the wall structures from the transfer of heat.

BACKGROUND OF THE INVENTION

Heat insulation material placed in walls, ceilings, roofs, floors and other "wall structures" typically comprise fibrous blanket insulation, such as elongated blankets formed of fiberglass. The principle of the blanket insulation is to form dead air spaces that provide insulation against convection and conduction heat transfer. The blanket insulation can be formed in small "clumps" and blown into spaces such as into the attics of residential homes and other building structures, and can also be made into elongated blankets formed in a specific width and depth that is suitable for placement between parallel joists, studs, rafters, and other parallel support structures that are uniformly spaced apart. The elongated blanket, such as a fiberglass blanket, is cut to the desired length at the job site for placement between the parallel structures. Also, a sheet of facing material usually is applied to one broad surface of the blanket, with the facing material having overhanging edges extending beyond the sides of the blanket to form "tabs" that can be applied by the installer to studs, joists, etc. of the building structure to hold the blanket in place.

Fiberglass is one of the most desirable materials for forming blanket insulation because it holds its shape and traps a substantial amount of air between its fibers to form the dead air spaces. However, the fiberglass alone does not provide adequate heat insulation against radiant heat transfer.

In the recent past, an additional sheet of reflective material has been applied to one of the broad surfaces of the blanket material. The reflective material, such as aluminum foil, functions as a barrier to radiant heat transfer.

One of the problems with the above noted structures is that when reflective surfaces of the foil engage another surface, such as the fiberglass of an adjacent insulation blanket or the adjacent gypsum board or other wall structure, the foil loses at least some of its ability to reflect heat. A space, such as a dead air space, must be maintained adjacent the foil so the foil can function as an effective heat reflector.

Another problem with the use of reflective surface in combination with other insulation materials is that if the surface should become dirty from an accumulation of dust, trash, fibers, vapor, etc., the reflective sheet looses its ability to reflect radiant heat.

It is this problem that the invention addresses.

SUMMARY OF THE INVENTION

Briefly described, the present invention comprises an improved heat insulation assembly for placement in and for becoming a part of a building structure, for insulating the structure from conduction, convection and radiation heat transfer through the wall structures of the building. This includes vertical walls, ceilings, roofs, floors and other structures that separate interior temperature controlled spaces from outside uncontrolled temperature spaces, generally referred to herein as "wall structures." In the disclosed embodiment radiant heat insulation is used, either alone or in combination with other types of heat insulation. The radiant heat insulation includes heat reflective sheet material, such as radiant heat reflective metal foil, radiant heat reflective metalized plastic sheet material, and plastic material coated with reflective substance such as metal. Typically, the foil and other radiant heat reflective sheet materials are silver in color or other efficient radiant heat reflective color. The reflective surface of the sheet is maintained in a spaced relationship with respect to the next adjacent structure, and is enclosed in a space that protects the reflective surfaces of the reflective sheet from the accumulation of dirt, dust, insulation fibers, vapor and other things that would occlude or diminish the reflective properties of the reflective surface of the reflective sheet.

In one embodiment of the invention, a pair of support sheets are arranged in superposed relationship having a lattice of seams formed there between to create an array of gas filled bubbles or cells to form a "cell blanket." A radiant heat reflective sheet is placed in each of the cells between the support sheets. The array of cells extends across the length and breadth of the cell blanket with the reflective sheets positioned in the cells so as to form a substantially continuous layer of radiant heat reflective sheet material about the length and breadth of the blanket. Preferably, the cells formed by the superposed support sheets of the cell blanket will be relatively large in area in comparison with the area occupied by the seams between the cells. For example the cells may be 12 inches square and the seams less than one inch wide. The cells are proportioned to be only slightly larger than the reflective sheets. This results in the area occupied by the seams in the superposed support sheets to be relatively small in comparison to the area occupied by the reflective sheets. Also, the smaller radiant heat reflective sheets versus the larger breadth cells avoids having the reflective sheets extend into the seams at the perimeters of the cells and, therefore, avoids the likelihood of conduction heat transfer from one side of the blanket to the other side of the blanket through the reflective sheets.

Another embodiment of the invention features a pair of reflective sheets positioned in each cell of the cell blanket, with the reflective sheets being spaced from one another by adhesion of the sheets to the opposed panels of the cell, so that the air in the cells maintains an open space between the reflective sheets in each cell. By maintaining the space between the radiant heat reflective sheets of each cell, the reflectability of the sheets is maintained. Also, by placing the radiant heat reflective sheets inside a closed cell, the likelihood of dust, dirt, insulation fibers and other undesirable items reaching the reflective surfaces of the radiant heat reflective sheets is substantially reduced, thereby maintaining the reflectivity of the sheets and prolonging the lifetime of the effective insulation qualities of the cell blanket The closed cells also avoid the entry of vapor into the cells so that acidic vapor or other chemicals carried by the vapor will not contact the reflective surfaces, thereby avoiding rust and corrosion of the reflective surfaces.

While the placement of individual reflective sheets in the cells of the blanket without extending them into the seams of the blanket helps to avoid conduction heat transfer through the blanket, a more expedient manufacturing procedure for producing a heat reflective cell blanket is to apply a large sheet of heat reflective material to the cell blanket that extends across several cells and the intersecting seams in the support sheets. While the insulation against conduction heat is reduced, the reflective sheet can be spread across a larger area of the cell blanket.

Another embodiment of the invention is a cell blanket with at least one of its support sheets being formed of metalized plastic sheet material having its opposed surfaces reflective. This provides reflective surfaces facing both inwardly and outwardly of the cells formed in the blanket. The inwardly facing reflective surface is protected from occlusion and contact by foreign objects, as described above. The outwardly facing reflective surface provides for radiant heat reflection as long as it retains its reflectivity, and this blanket likely will be used in situations where the likelihood of occlusion of the outer surface is not expected.

Another embodiment of the invention is the use of a metalized polyester film applied to the interior of a support sheet.

The last described constructions avoid having separate heat reflective sheets positioned in each cell between the support sheets of the cell blanket and retain the features of space maintained adjacent the interior reflective surfaces and the protection of the reflective surfaces from accumulation of dirt, dust, fibers, vapor, etc. to avoid occlusion of the reflective surfaces.

While the radiant heat reflective cell blanket provides the capacity for reflection of radiant heat, the gas within the cells and the support sheets also provide insulation against convection and conduction heat transfer.

The seams formed in the support sheets can be produced by heat fusion when the support sheets are formed of heat fusible material, such as polyester, polypropylene. In the situations when the fusion of the layers of material is not practical, adhesive bonding of the seams is possible.

The radiant heat reflective cell blankets disclosed herein can be included in various combinations with other heat insulation structures. For example, the blankets can be mounted in superposed relationship at one or both of its side surfaces with a fiberglass blanket, thereby providing the combination of radiant heat insulation by the radiant heat reflective cell blanket as well as additional conduction and convection insulation provided by the fiberglass blankets. This combination of heat insulators is suitable for use in roofs, walls, attics, floors, and in most places of dormant activity requiring heat insulation.

Another embodiment of the invention is the combination of the above described cell blanket with gypsum board or foam board or other board that forms the interior walls of a building structure. The cell blanket can be applied to one or to both surfaces of the board, or the cell blanket can be positioned between a pair of boards Another embodiment of the invention is the use of the above described heat reflective cell blanket in combination with both a fiberglass blanket and a foam, gypsum or other board in an external wall structure of a building.

Yet another embodiment of the invention is the placement of the heat reflective cell blanket in an attic structure, either on top of the preexisting fibrous insulation, or by placement of the cell blanket adjacent the ceiling board and the fiberglass insulation that would be laid atop the heat reflective cell blanket. The cell blanket can be added to many types of pre-existing insulated structures.

Another embodiment of the invention is the use of multiple layers of the heat reflective cell blanket. This provides not only the multiple layers of the blanket insulation but also the dead air trapped between the cell blankets.

All the embodiments of the invention provide a layer of radiant heat reflective sheet material having its reflective surface protected from the accumulation of dirt, dust, insulation fibers, vapor etc. that would occlude, tarnish or reduce the reflective capacity of the sheet material, together with a space maintained at the face of the heat reflective sheet so as to preserve the reflective abilities of the sheet.

Thus, it is an object of this invention to provide an improved heat reflective blanket for placement in a wall structure or other portion of a building structure for the purpose of shielding the building structure from the transfer of radiant heat.

Another object of this invention is to provide an improved radiant heat reflective cell blanket for placement in a wall structure in combination with other heat insulation materials, such as fiberglass blanket insulation, foam board, and other conventional structures of heat insulated wall structures.

Another object of this invention is to provide heat insulation material for application to a wall structure of a building, utilizing a radiant heat reflective cell blanket that includes radiant heat reflective sheet material placed in the cells of a cell blanket so that the cells protect the reflective material against the accumulation of dust, dirt, fibers, vapor and other things on the surface of the sheet, and for maintaining a space adjacent the reflective surface of the sheet.

Other objects, features and advantages of this invention will become apparent upon reading the following specification, when taken in conjunction with the accompanying drawings.

BRIEF DESCRIPTION OF THE DRAWINGS

FIG. 6 is an end cross-sectional view of the combination of the radiant heat reflective cell blanket and fiberglass blanket insulation of FIG. 4 installed in a roof structure of an industrial building.

FIG. 7 is a side elevational view of an insulated wall structure, including the heat radiant heat reflective cell blanket, fiberglass insulation, sheet rock, exterior board and exterior facing.

FIG. 8 is an end cross-sectional view of the attic structure of a building, showing the insulation of the radiant heat reflective cell blanket superposed on the joists and fibrous insulation installed between the joists.

DETAILED DESCRIPTION

Figure 1:
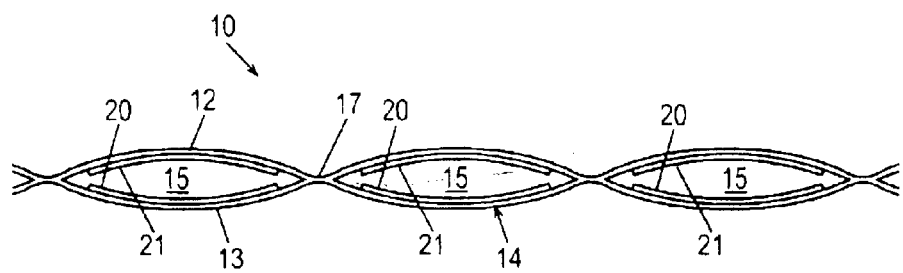
FIG. 1 is a side cross-sectional view of a segment of the radiant heat reflective cell blanket.

Referring now in more detail to the drawings in which like numerals indicate like parts throughout the several views, FIG. 1 illustrates the radiant heat reflective cell blanket 10 that includes a pair of superposed sheets, upper sheet 12 and lower sheet 13, that form cells 14 therebetween. The sheets 12 and 13 are formed of thermoplastic material, such as polypropylene, polyester, etc., and the sheets are shaped with recesses that are matched together to create cells. The cells are filled with air or other gas to form dead air spaces 15.

Figure 2:
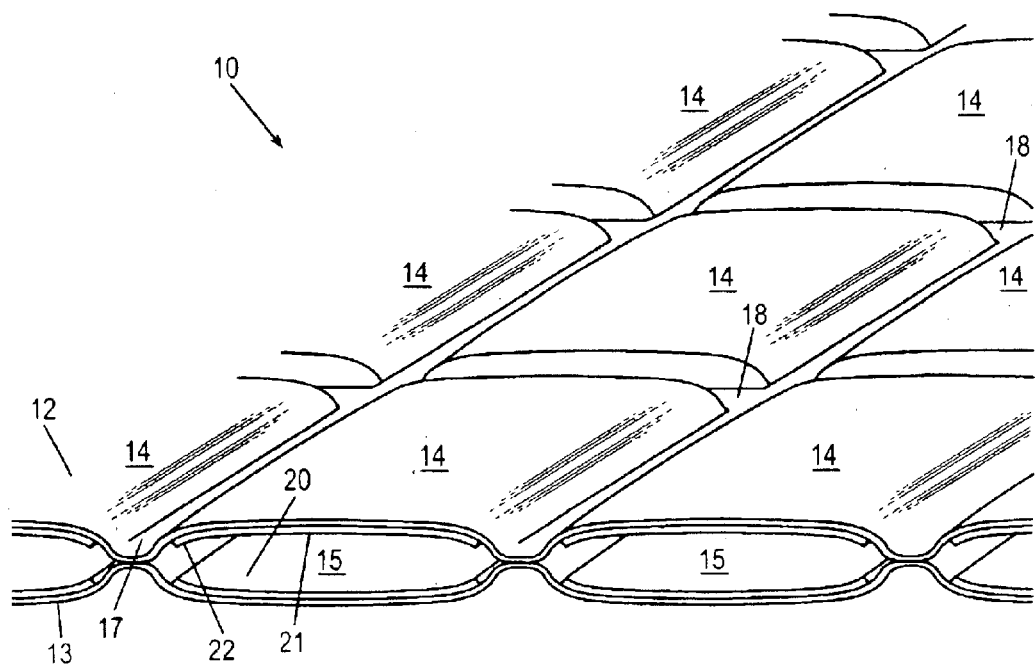
FIG. 2 is a perspective view of a portion of a radiant heat reflective cell blanket.

As shown in the embodiment of FIG. 2, the superposed sheets 12 and 13 are formed with a first plurality of heat fused seams 17 that extend parallel to one another and a second plurality of heat fused seams 18 that extend parallel to one another and transverse to the seams 17. This forms a grid of heat fused seams in a rectangular pattern about the blanket 10, with the cells 14 located between the seams. The rectangular arrangement of the seams facilitates folding of the cell blanket for storage and handling and installation in a folded configuration.

The intersecting seams 17 and 18 form continuous heat fused perimeter seams about each cell. The length and breadth of each cell is relatively large in comparison to the length and breadth of the perimeters about the cells formed by the heat fused seams 17 and 18 so as to maximize the size of the cells and minimize the size of the seams.

In one embodiment of the invention, each cell 14 includes at least one sheet of heat reflective material 20, such as metal foil. In the embodiments illustrated herein, there are two sheets of foil, 20 and 21, arranged in opposed relationship within each cell. Each sheet is of a length and breadth slightly smaller than the length and breadth of the interior space of its cell, so that a gap 22 is formed at the edges of the sheet material, about the complete perimeter of the reflective sheet material. This avoids having the reflective sheet material in contact with each other in a single cell, and avoids having the reflective sheet material protrude into the perimeter heat fused seams 17 and 18. With this arrangement, the likelihood of conduction heat transfer between the sheets 20 and 21 is reduced.

Adhesive (not shown) is applied between the superposed sheets 12 and 13 and the heat reflective sheets 20 and 21, respectively, mounting the sheets in spaced relationship with respect to each other, so that the dead air space 15 is preserved between the heat reflective sheets.

While pairs of heat reflective sheets 20 and 21 are disclosed herein, the cell blanket can be formed with single sheets 20 or 21, as may be desired.

The large ratio of cell area to the heat fused seams 17 and 18 results in the heat reflective sheets 20 and 21 forming a major percentage of the area of the cell blanket, forming an effective radiant heat reflective surface in the cell blanket.

Figure 3:
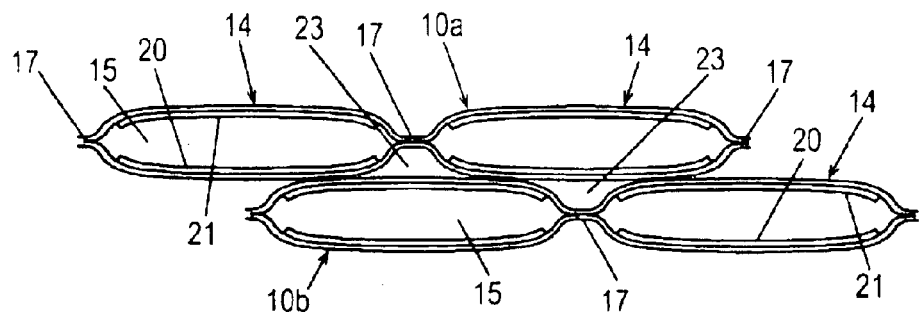
FIG. 3 is a side cross-sectional view of a pair of superposed heat reflective cell blankets.

As illustrated in FIG. 3, multiple ones of the radiant heat reflective cell blanket 10, such as blanket 10a and blanket 10b, can be used in superposed relationship, providing significant dead air space 15 in each of the cells, and additional dead air space 23 externally of the cell blankets adjacent the perimeter heat fused seams 17 and 18. Moreover, the cell blanket in this configuration provides conduction and convection heat insulation.

Figure 4:
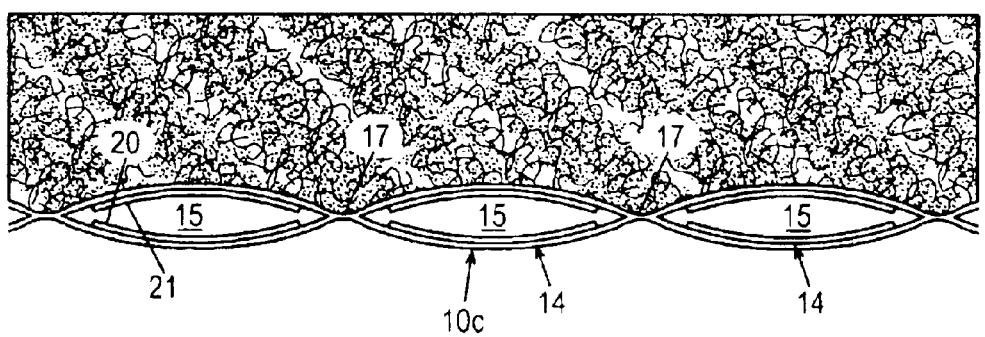
FIG. 4 is a side cross-sectional view of the combination of a radiant heat reflective cell blanket and fiberglass blanket insulation.

FIG. 4 shows an additional combination of heat insulation elements, showing a radiant heat reflective cell blanket 10c in combination with fibrous insulation blanket 30. The blanket 30 can be loose fibrous insulation or a formed blanket of insulation having specified width, depth and cut to length. The blanket 30 can be adhered to the cell blanket 10c by conventional adhesive, or the blanket 30 can rest upon the cell blanket 10c.

Figure 5:
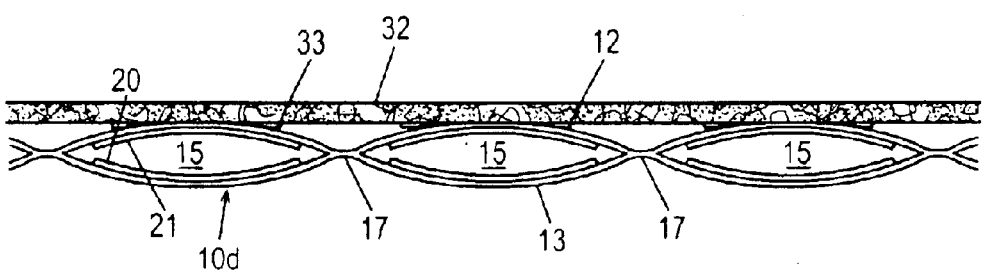
FIG. 5 is a side cross-sectional view of a radiant heat reflective cell blanket and gypsum board.

FIG. 5 illustrates another combination of heat insulation structures, including the cell blanket 10d and a width of board, such as gypsum board 32. Again, adhesive 33 can be applied to the cell blanket and the board 32 for the purpose of holding the cell blanket to the board, as may be desired.

Another embodiment of the invention is the formation of the cell blanket with at least one of the superposed support sheets formed with a heat reflective metalized plastic film, with the reflective film positioned to face the interior of cell and being of a silver color or other heat reflective color. The reflective sheets 20 and 21 of FIGS. 1–5 are not required for this embodiment of the invention. The heat reflective support sheets are formed as illustrated in the figures of the drawing except for the presence of the reflective sheets 20 and 21 in FIGS. 1–5, with the support sheets providing the internal reflective surfaces required for radiant heat reflection. One or both of the support sheets can be formed over an entire surface with the metalized plastic film and the support sheets having their metalized heat reflective films facing the interior of the cells and the seams between the cells can be fused directly through the metalized reflective surface.

Another embodiment of the invention is one or both of the support sheets 12 and 13 being formed of a metalized product as described above with both sides of the product bearing a metalized laminate so that both sides are heat reflective.

The metalization of plastic sheet material can be performed on polyester, polyethylene, polyvinyl chloride, polypropylene, and other conventional materials and can be performed by Metalized Products, Inc. of Winchester, Mass. 01890.

FIG. 6 illustrates the combination of the cell blanket of FIGS. 1–5 as described above and fibrous insulation installed in the roof structure of an industrial building. The building includes a plurality of parallel rectilinear purlins, such as purlins 34 and 35, and sheet roofing material 36 applied to the purlins. The fiberglass blanket 30 is moved up between the purlins, and the cell blanket 10c is positioned in contact with the lower flange 34a and 35a of the adjacent purlins 34 and 35. The cell blanket is connected by adhesive, screws, rivets, or other conventional connectors to the lower flanges 34a and 35a of the purlins 34 and 35. This suspends the cell blanket from the purlins, with the fiberglass blanket 30 resting on the cell blanket.

FIG. 7 illustrates a vertical wall structure having spaced studs (not shown), an exterior wallboard 38, an interior wallboard 39, an exterior brick facade 40, cell blanket 41, and a fibrous blanket 42. A vapor barrier sheet 44 is adhesively applied to a broad surface of the blanket 42 that faces the interior 45 of the building structure. The vapor barrier sheet 44 also extends beyond the sides of the blanket 42 for the purpose of connecting the blanket to the studs of the wall structure (not shown). The cell blanket 41 can be adhesively applied to the facing surface of the interior wallboard 39 or to the facing surface of the fibrous blanket 42, as may be desired.

FIG. 8 illustrates the combination of the cell blanket and fibrous blanket, similar to FIG. 4, but in the environment of a ceiling structure. The cell blanket 10*d* is laid across the joists 48 and the fibrous blanket 49, effectively applying an additional layer of insulation to the ceiling structure. The wallboard 50 supports the fibrous insulation, such as fiberglass, and the cell blanket 10*d* rests on the fiberglass and joists 48.

Figure 9:
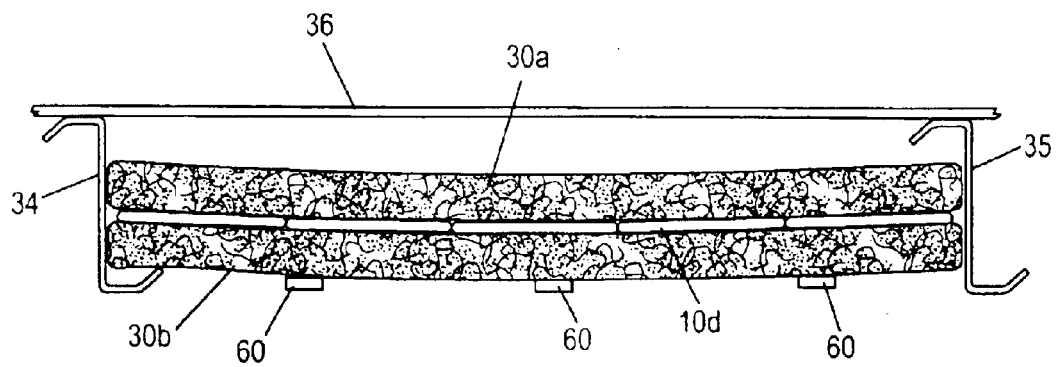
FIG. 9 is an end cross sectional view of a pair of fiber insulation blankets in a sandwich relationship about a cell blanket installed in the roof of an industrial building.

FIG. 9 illustrates the combination of the cell blanket 10*d* positioned between a pair of fibrous blankets 30*a* and 30*b*, with the blankets being installed in the roof structure of a metal building. The roof structure includes the conventional parallel purlins 34 and 35 and the sheet material 36 applied to the upper surfaces of the purlins.

The FIG. 9 arrangement can be supported in place by longitudinal straps extending parallel to the purlins and over the rafters (not shown) of the building structure, or by other conventional support means.

While FIG. 9 illustrates a sandwiched relationship of fibrous blankets straddling a cell blanket, a reverse sandwich can be achieved by arranging cell blankets on the opposite sides of a fiber blanket, if desired.

Figure 10:
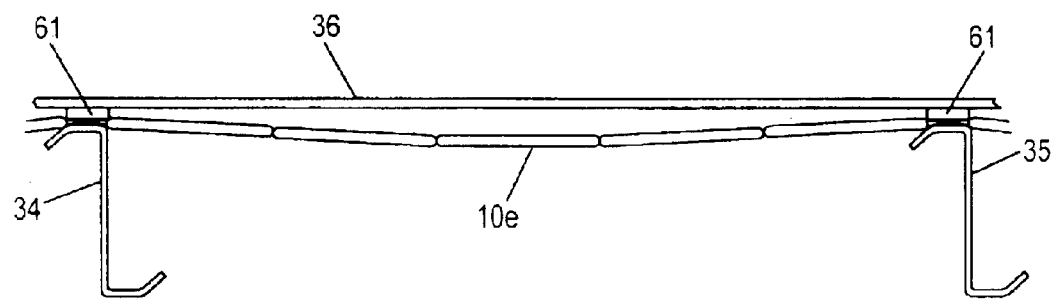
FIG. 10 is an end cross sectional view of a cell blanket extending across the purlins of an industrial building.

FIG. 10 illustrates the placement of the cell blanket 10*e* with its length extending across the lengths of the purlins 34 and 35 of the industrial building, beneath the hard roof material 36. Hard insulation blocks 61 are placed atop the purlins, with the blocks being formed of rigid material, holding the sheet metal roofing 36 away from the purlins, thereby avoiding conduction heat transfer.

In this embodiment, the relatively small size of the tops of the purlins and the hard insulation 61 tends to cause the immediate portion of the cells of the cell blanket to collapse, but with the cells retaining their impermeability by expansion of the other portions of the cells by the contained gas. The portions of the cells that are collapsed lose the radiant heat insulation property of the cells, but the addition of the hard insulation material 61 tends to compensate for some of the lost insulation. It is anticipated that, in some instances, the cells resting directly on top of the purlins 34 and 35 will collapse.

As can be seen by the embodiments of the invention, each cell of the cell blanket maintains an enclosure about the reflective surfaces, protecting the reflective surfaces from the accumulation of dirt, dust, debris, fibers and vapor, thereby avoiding occlusion of the reflective surfaces of the sheet. In addition, the dead air space 15 avoids the contact of the opposing sheet 12 or 13 with the reflective surfaces, always maintaining the necessary space adjacent the reflective surfaces for effective reflection of heat from the cell blanket.

While the cells 14 have been illustrated as substantially square, other cell configurations can be formed, as may be desired. For example, the cells can be formed in elongated rectangular shapes, or formed in circular shapes. However, it is desirable to have a high ratio of cell area to seam area to maximize the reflectivity of the blanket. Also, it is desirable to have the seams between the cells extend rectilinearly to facilitate folding of the blanket for storage, handling and installation in a folded configuration.

Other gases besides air can be present within the cells, such as carbon dioxide, argon, nitrogen and freon.

The cell blanket can be attached to other objects with adhesive without flattening the cells. The flattening of the cells is undesirable since it reduces the heat insulation capacity of the blanket. However the blanket can be attached at its seams between the cells to other objects with nails, staples and other connectors that penetrate the seams of the blanket without penetrating the cells, therefore maintaining the insulation capabilities of the blanket. Also, when some cells are flattened, the other cells will maintain their cell structure and insulation capabilities.

It is desirable that the heat reflective sheets 20 and 21 in their cells or the reflective interior surfaces of the cells of the support sheets with a meatlized coating be separated from each other or from any other object that has the potential of reducing the reflective properties of the sheet. The dimension of the separation is at least ¼ inch, preferably at least ½ inch, to provide adequate separation for optimum radiant heat reflection. Accordingly, the gas inserted in the cells and the size and shapes of the cells are calibrated to maintain the required minimum spacing adjacent reflective sheets. It is not necessary to fully inflate the cells to maintain the desired separation from the reflective surfaces.

In another embodiment of the invention, the cells can be formed with small openings for the movement there through of air when being inflated or deflated. This might be desirable for storing the cell blanket in a flat configuration. In order to positively maintain separation of the heat reflective surfaces within each cell upon unfolding and installation of the blanket, separators, such as compressible sponge material 54, are placed within each cell. The separators can be compressed when a cell is collapsed for the purpose of rolling up or otherwise packing the cell blanket in a small container. When the cell blanket is unrolled or otherwise unpacked, the sponge separators 54 can expand to force the separation of the opposed superposed sheets 12 and 13, thereby establishing the necessary separation for adequate radiant heat reflection. Air can leak into or out of the cells when the blanket is unfolded or folded.

While the expression "dead air space" has been utilized to describe the space in the cells that are formed between the superposed sheets of the cell blanket, the spaces can have movement of air or other gases into or out of the spaces and not be perfectly "dead" air.

Although preferred embodiments of the invention have been disclosed in detail herein, it will be obvious to those skilled in the art that variations and modifications of the disclosed embodiments can be made without departing from the spirit and scope of the invention as set forth in the following claims.

I claim:

1. A heat insulation blanket assembly for placement in a wall structure, comprising:

a radiant heat insulation cell blanket for reflecting heat including a pair of superposed support sheets of flexible material connected together by intersecting seams with an array of gas filled cells formed between said pair of superposed support sheets, at least one of said superposed sheets of said cell blanket being formed of translucent material, a radiant heat reflective sheet positioned between said support sheets and extending across several of said cells and seams for reflecting radiant heat from said blanket, so that the superposed support sheets protect the radiant heat reflective sheet in said cells from accumulation of dust and from contact with other objects, and a fibrous heat insulation blanket applied to one of said support sheets of said radiant heat insulation blanket, said fibrous heat insulation blanket configured for placement between joists of a wall structure.

2. The heat insulation blanket assembly of claim 1, wherein said radiant heat reflective sheet is formed of reflective metal foil.

3. The heat insulation blanket assembly of claim 1, wherein said radiant heat reflective sheet is formed of metal foil.

4. The heat insulation blanket assembly of claim 1, wherein said radiant heat reflective sheet comprises at least one of said superposed support sheets being heat reflective.

5. The heat insulation blanket assembly of claim 1, wherein said radiant heat reflective sheet comprises at least one of said superposed support sheets being formed with its opposed surfaces heat reflective.

6. The heat insulation blanket assembly of claim 1, and further including a board applied to one of said support sheets.

7. The heat insulation blanket assembly of claim 1, wherein said cells are filled with a gas selected from a group consisting of: carbon dioxide, nitrogen, argon, air, and freon.

8. A radiant heat insulation blanket for reflecting heat comprising:

a pair of superposed support sheets of flexible translucent material connected together with an array of gas filled cells formed therein, a radiant heat reflective surface positioned in said cells for reflecting radiant heat away from said blanket, so that the superposed support sheets protect the radiant heat reflective surface in said cells from accumulation of dust and from contact with other objects, said radiant heat reflective sheet is sized to extend less than the full breadth of the cells.

9. A radiant heat insulation blanket for reflecting heat comprising:

a pair of superposed support sheets of flexible translucent material connected together with an array of gas filled cells formed therein, a radiant heat reflective surface positioned in said cells for reflecting radiant heat away from said blanket, so that the superposed support sheets protect the radiant heat reflective surface in said cells from accumulation of dust and from contact with other objects, and resilient objects placed in said cells for urging apart said pair of superposed support sheets of each cell.

10. A radiant heat insulation blanket for reflecting heat comprising:

a pair of superposed support sheets of flexible heat fusible material heat fused together in an array of gas filled cells, at least one of said support sheets including a heat reflective surface facing within said cells for reflecting radiant heat, the other of said support sheets being translucent, so that the superposed support sheets protect the radiant heat reflective surface from accumulation of dust and from contact with other objects.

11. The radiant heat insulation blanket of claim 10, and further including a fibrous heat insulation blanket applied to one of said support sheets.

12. The radiant heat insulation blanket of claim 10, and further including a board applied to one of said support sheets.

13. The radiant heat insulation blanket of claim 10, wherein said cells are filled with a gas selected from the group consisting of: air, nitrogen, carbon dioxide, argon and freon.

14. A radiant heat insulation blanket for reflecting heat comprising:

a pair of superposed support sheets of flexible heat fusible material heat fused together in an array of gas filled cells, at least one of said support sheets including a heat reflective surface facing within said cells for reflecting radiant heat, the other of said support sheets being translucent, so that the superposed support sheets protect the radiant heat reflective surface from accumulation of dust and from contact with other objects, wherein said radiant heat reflective surface is formed of materials selected from the group consisting of: metalized polyester, metalized polyethylene, metalized polyvinyl chloride, and metalized polypropylene.

15. A radiant heat insulation blanket for reflecting heat comprising:

a pair of superposed support sheets of flexible heat fusible material heat fused together in an array of gas filled cells, at least one of said support sheets including a heat reflective surface facing within said cells for reflecting radiant heat, the other of said support sheets being translucent, so that the superposed support sheets protect the radiant heat reflective surface from accumulation of dust and from contact with other objects, and said radiant heat reflective sheets being sized to extend less than the full breadth of the cells.

16. A radiant heat insulation blanket for reflecting heat comprising:

a pair of superposed support sheets of flexible heat fusible material heat fused together in an array of gas filled cells, at least one of said support sheets including a heat reflective surface facing within said cells for reflecting radiant heat, the other of said support sheets being translucent, so that the superposed support sheets protect the radiant heat reflective surface from accumulation of dust and from contact with other objects, and resilient objects placed in said cells for urging said pair of superposed support sheets apart.

\* \* \* \* \*